(12) United States Patent
Rettaroli et al.

(10) Patent No.: US 10,909,273 B2
(45) Date of Patent: Feb. 2, 2021

(54) SELECTIVE DATA SECURITY WITHIN DATA STORAGE LAYERS

(71) Applicant: Accenture Global Solutions Limited, Dublin (IE)

(72) Inventors: Piergiorgio Rettaroli, Rome (IT); John V. Velissarios, London (GB); Salvatore Gifuni, Rome (IT); John W. Elliott, San Diego, CA (US)

(73) Assignee: Accenture Global Solutions Limited, Dublin (IE)

( * ) Notice: Subject to any disclaimer, the term of this patent is extended or adjusted under 35 U.S.C. 154(b) by 342 days.

(21) Appl. No.: 15/958,547

(22) Filed: Apr. 20, 2018

(65) Prior Publication Data

US 2018/0307868 A1    Oct. 25, 2018

(30) Foreign Application Priority Data

Apr. 21, 2017    (IT) .................. 102017000044505

(51) Int. Cl.
*H04L 9/00* (2006.01)
*G06F 21/78* (2013.01)
*H04L 29/06* (2006.01)
*H04L 9/32* (2006.01)
*H04L 9/08* (2006.01)
*G06F 21/72* (2013.01)
*H04L 9/30* (2006.01)

(52) U.S. Cl.
CPC .............. *G06F 21/78* (2013.01); *G06F 21/72* (2013.01); *H04L 9/0822* (2013.01); *H04L 9/0894* (2013.01); *H04L 9/30* (2013.01); *H04L 9/3236* (2013.01); *H04L 63/045* (2013.01); *H04L 63/10* (2013.01); *H04L 2209/12* (2013.01); *H04L 2209/38* (2013.01)

(58) Field of Classification Search
CPC .......... G06F 21/30; H04W 12/00; H04L 9/00
See application file for complete search history.

(56) References Cited

U.S. PATENT DOCUMENTS

2014/0108786 A1*  4/2014  Kreft .................. H04L 63/0428
                                                           713/156

FOREIGN PATENT DOCUMENTS

EP           1320014 A2       6/2003
WO       WO 97/42726       11/1997

OTHER PUBLICATIONS

McConaghy, Trent, et al., "BigchainDB: A Scalable Blockchain Database," Jun. 8, 2016, https://www.bigchaindb.com/whitepaper/bigchaindb-whitepaper.pdf, (66p).

(Continued)

*Primary Examiner* — Joseph P Hirl
*Assistant Examiner* — Leynna Truvan
(74) *Attorney, Agent, or Firm* — Brinks Gilson & Lione

(57) ABSTRACT

A data storage layer provides enhanced data security. In one implementation, the data storage layer allows selective encryption of specific parts of data blocks, with decryption restricted to pre-determined entities. The selective encryption may be applied to parts of data blocks that are stored in blockchains, for instance, to provide fine grained control over which entities with access to the blockchain can decrypt and use the parts of the data blocks with the enhanced security.

18 Claims, 5 Drawing Sheets

(56) References Cited

OTHER PUBLICATIONS

Zyskind, Guy, et al., "*Enigma: Decentralized Computation Platform with Guaranteed Privacy*," Jun. 10, 2015, https://www.enigma.co/enigma_full.pdf. (14p).

https://ethereum.stackexchange.com/questions/7842/storing-document-file-in-blockchain, Aug. 8, 2015, (3p).

https://security.stackexchange.com/questions/91704/which-strategy-to-encrypt-data-accessed-by-multiple-users—Information Security Stack Exchange, Jun. 15, 2015, (6p).

Office Action to Italian Application No. 201700044505, dated Dec. 19, 2017, (11p).

Extended European Search Report for European Application No. 18168339.2, dated Aug. 21, 2018, pp. 1-9.

Examination Report for European Application No. 18168339.2, dated Feb. 26, 2020, 4 pages.

\* cited by examiner

SELECTIVE DATA SECURITY WITHIN DATA STORAGE LAYERS

PRIORITY

This application claims priority to, and incorporates by reference in its entirety, Italian Patent Application No. 102017000044505, filed Apr. 21, 2017, and entitled Selective Data Security within Data Storage Layers.

TECHNICAL FIELD

This application relates to data security in data storage layers. This application also relates to selective encryption techniques applied to specific portions of transaction data stored in a data storage layer, e.g., in a blockchain.

BACKGROUND

The explosive global growth of high speed communication networks, processing power, and data storage have led to new paradigms for data representation, data validation and security, and data sharing. Among the new paradigms are secure data storage layers that implement, e.g., blockchain structures and protocols. Improvements to data security in data storage layers will further drive the widespread adoption of data storage layers and enhance the practical functionality of data storage layers.

DETAILED DESCRIPTION

Figure 1:
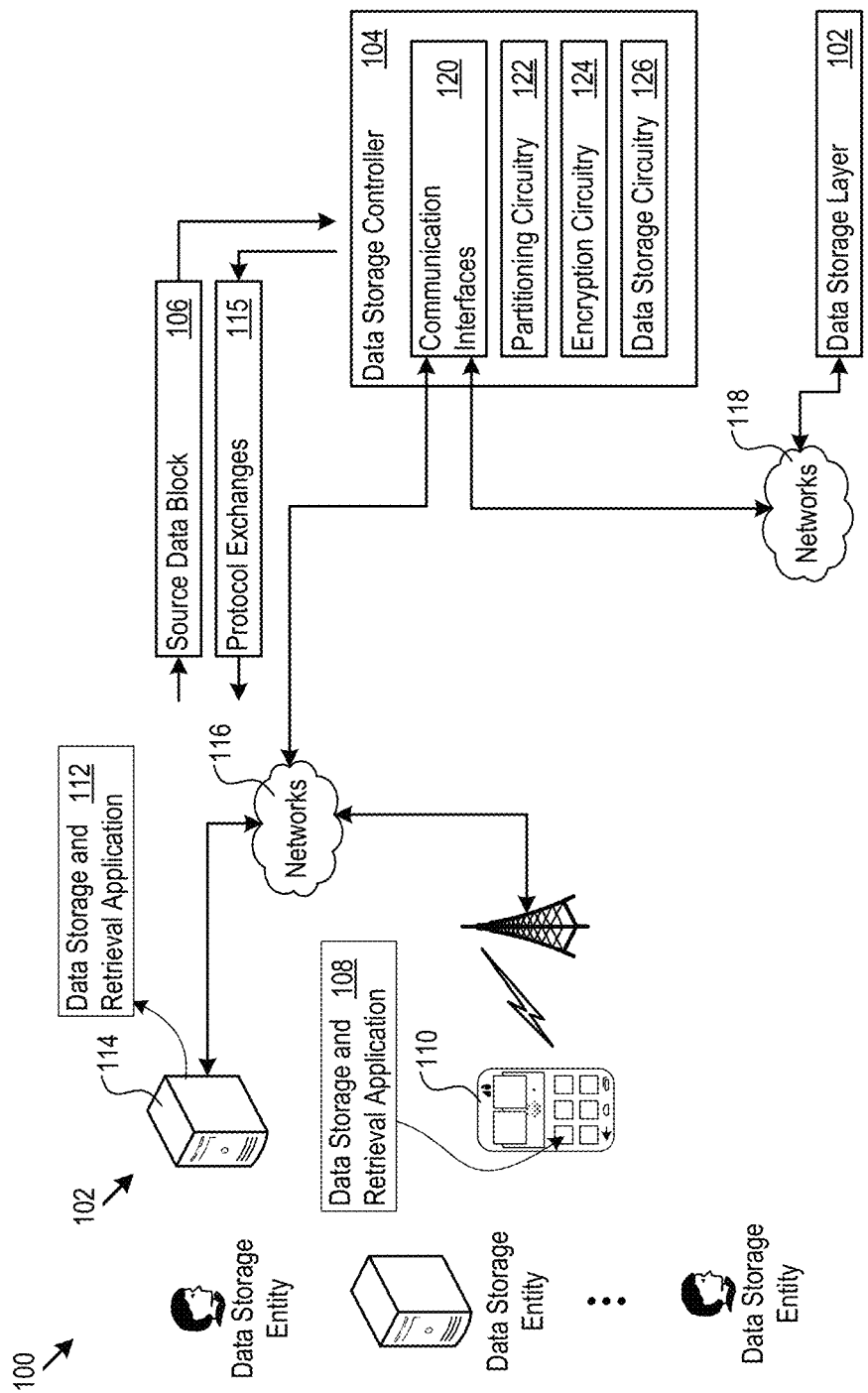
FIG. 1 shows an example of entities storing and retrieving data through a data storage controller.
Figure 2:
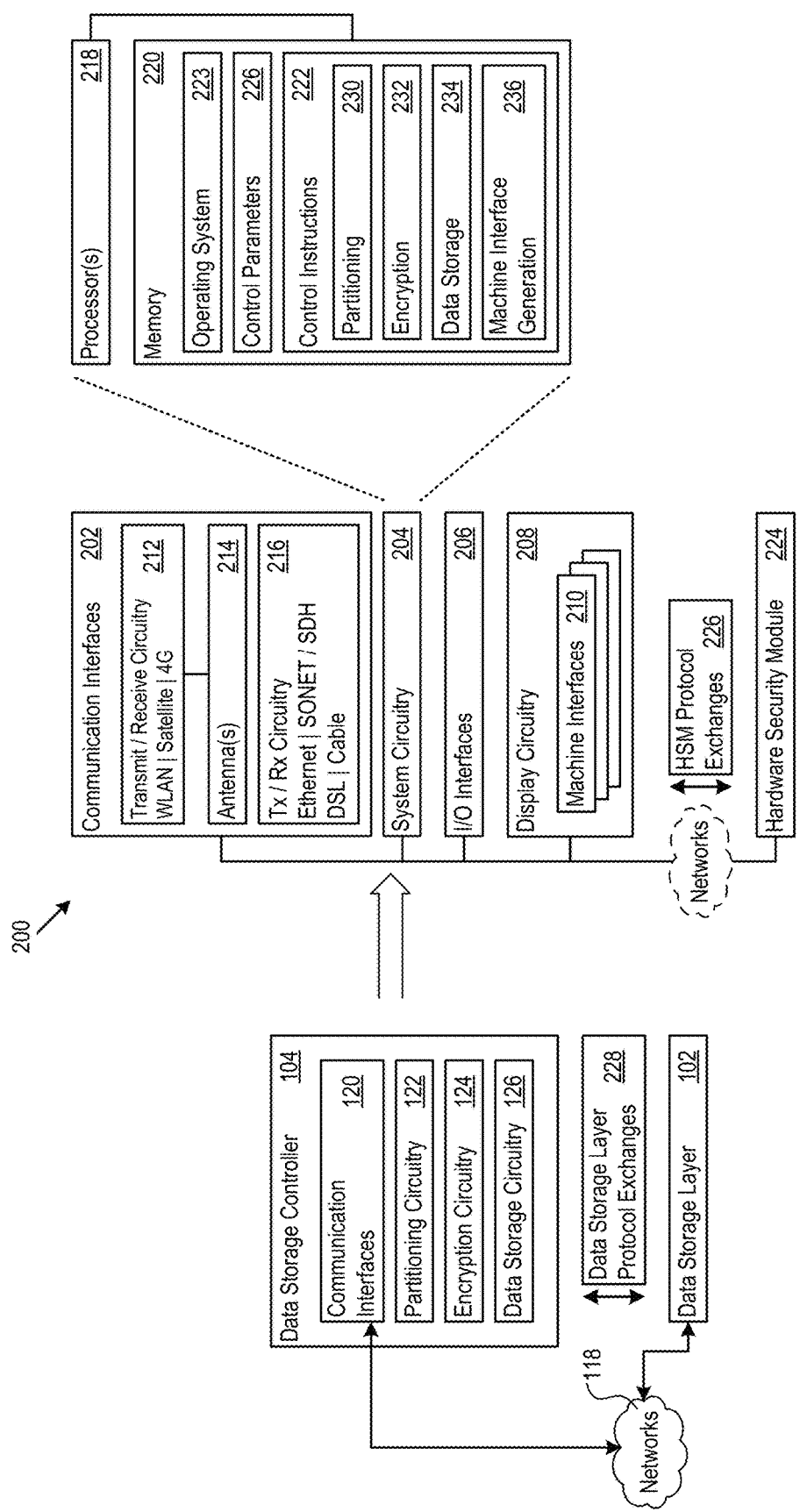
FIG. 2 shows an example implementation of a data storage controller.

FIGS. 1 and 2 provide an example context for the discussion below of the technical solutions in the data storage system. The examples in FIGS. 1 and 2 show possible implementations. In that respect, the technical solutions in the architecture are not limited in their application or implementation to the systems shown in FIGS. 1 and 2, or any of the other Figures. Instead, the technical solutions may be implemented via many other system implementations, architectures, and connectivities.

In various systems, data storage layers such as blockchains may be used to generate a record of transactions, agreements, reference data, metadata, or other data. In some cases, data storage layers may refer to software and/or hardware resources used to the support the storage of data. The record may be shared among nodes and independently verified by the individual nodes via technical cryptographic process. In some implementations, to support the creation of the record and/or the verifiability of the data, the data in the data storage layers may make the stored data public to the individual nodes. In some cases, the data may include sensitive private data that should not be shared among the nodes. The techniques and architectures discussed herein provide a system for selective access to the data record. Thus, the techniques and architectures provide the a technical, cryptographic solution to the technical problem of supporting verifiability and sharing without necessarily providing data access to each node with shared access to the data storage layer. Accordingly, the techniques and architectures, including the use of symmetric and asymmetric encryption keys, improve the technical security and stability of the underlying hardware of the data storage layer and provide improvements over existing market solutions.

FIG. 1 shows several entities 100 that store and retrieve data from a data storage layer 102. The entities 100 may be software or firmware processes, artificial intelligence modules, hardware systems, or individuals, as a few examples. The data storage controller 104 facilitates storing data in the data storage layer 102 and may apply selective data security to that data. In that respect, the entities 100 transmit source data blocks 106 to the data storage controller 104 for processing. For instance, a smartphone application 108 running on the smartphone 110 or a desktop PC application 112 running on the PC 114 may accept source data of any type from the entity, connect to the data storage controller 104, and transmit the source data blocks 106 to the data storage controller 104. Data storage protocol exchanges 115 between the entities and systems occurs over any number and type of public or private networks, e.g., the networks 116 and 118.

As described in detail below, the data storage controller 104 applies selective data security to the data submitted in the source data block. To that end, the data storage controller 104 includes communication interfaces 120 that connect to the networks 116 and 118, as well as query partitioning circuitry 122, encryption circuitry 124, and data storage circuitry 126.

The partitioning circuitry 122 separates the source data block into a public data block and a private data block and determines one or more communication partners that are allowed visibility to the private data block. In some cases, communication partners may refer to one or more network nodes, e.g., network-connected hardware computing devices, that may have access to a data storage layer. In some cases, a public data block may refer to data block contents that may be generally accessible to communication partners. Data on public communication blocks may be encrypted or unencrypted. Accordingly, although generally accessible by communications partners, data on a public data block may not necessarily be generally intelligible by the communication partners, e.g., in cases where the data is encrypted. In some cases, a private data block may include a data block that is selective visible to select communication partners. Using the architectures and techniques discussed herein, data from a private data block may be encrypted and placed on a public data block without necessarily forgoing the selective visibility to the data of the private data block, e.g., because the encrypted data may still remain unintelligible on the public data block. The encryption circuitry 124 obtains a symmetric encryption key and obtains separate asymmetric encryption keys, e.g., public keys, linked (e.g., assigned, owned, or allocated) to each communication partner. The encryption circuitry 124 then encrypts the private data block with the symmetric encryption key to obtain a protected private data block, and encrypts the symmetric encryption key with the asymmetric encryption keys to obtain protected decryption keys. The communication partners maintain the counterpart asymmetric encryption keys (e.g., the private keys) in confidence.

The data storage circuitry 126 is in communication with the encryption circuitry. The data storage circuitry 126 is configured to add the public data block, the protected private data block, and the protected decryption keys to a public data storage element. The data storage circuitry 126 is further configured to queue the public data storage element for insertion into the data storage layer. In one implementation, the data storage layer is a blockchain that stores one or more public data storage elements in each blockchain block. Each communication partner may then access the public data storage element, recover the symmetric key by decryption using its asymmetric key counterpart, and decrypt the protected private data block with the recovered symmetric key.

FIG. 2 shows an example implementation 200 of the data storage controller 104. The example implementation 200 includes communication interfaces 202, system circuitry 204, input/output (I/O) interfaces 206. The data storage controller 104 includes display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, keys, switches, speakers and other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11b, g, n, or ac. The communication interfaces 202 may also include physical transceivers 216. The physical transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the data storage controller 104. As just one example, the system circuitry 204 may include one or more instruction processors 218 and memories 220. The memory 220 stores, for example, control instructions 222 executed by an operating system 223. In one implementation, the processor 218 executes the control instructions 222 and the operating system 223 to carry out any desired functionality for the data storage controller 104. The control parameters 226 provide and specific configuration and operating options for the control instructions 222, operating system 223, and other functionality of the data storage controller 104.

In some implementations, the data storage controller 104 communicates with a local or remote hardware security module (HSM) 224 through an encryption request interface defined in the system circuitry 204 with data flow through the communication interfaces 202. The encryption request interface submits encryption requests and encryption parameters (e.g., symmetric and asymmetric keys or identifiers of the symmetric and asymmetric keys) via pre-defined HSM protocol exchanges 226 to the HSM 224 and receives the encrypted results from the HSM 224. The encryption interface also supports the submission of decryption requests and decryption parameters to the HSM 224 and reception of decrypted results from the HSM 224.

The control instructions 222 include partitioning logic 230, encryption logic 232, and data storage logic 234. In addition, machine interface generation logic 236 creates and delivers a linked interactive set of GUIs that facilitate interaction with the data storage controller 104, e.g., to accept submissions of source data blocks, symmetric keys, asymmetric keys, consensus protocol choices, and other input data, and to deliver data storage status to the entities 100. In some cases, a consensus protocol may include one or more actions, content requirements, rules, proof-of-work requirements, formatting, and/or other protocol components used in determining whether a block may be validly stored within a data storage layer, e.g., a blockchain. The partitioning logic 230 decides which data to protect and which to leave unaltered. The encryption logic 232 carries out the protection and packages protected and unaltered data elements into a public data storage element. The data storage logic 234 arranges for insertion of the public data storage element into the data storage layer 102, e.g., by executing data storage layer protocol exchanges 228. The data storage layer protocol exchanges 228 may, for instance, queue the public data storage element for insertion by issuing an inclusion request for the public data storage element to a network of joint operators of the data storage layer. As one particular example, the inclusion request takes the form of a blockchain inclusion request sent to block mining entities or other participants in a private blockchain, the inclusion request specifying addition of the public data storage element to the next available blockchain block. In some cases, a joint operator may include an entity in control of one or more hardware resources used in supporting the data storage layer. In some cases, an inclusion request may include a message or other communication to a data storage layer operator to request an addition of a block to the data storage layer.

The partitioning logic 230, encryption logic 232, data storage logic 234, and machine interface generation logic 236 improve the functioning of the underlying computer hardware itself. That is, these features (among others described below) are specific improvements in the way that the underlying computer system operates. The improvements facilitate selective enhanced protection of data in a public data storage layer. The selective nature of the protection provides efficiency gains because resources are not expended unnecessarily protecting all of the data in the data storage layer. The selective protection provides the additional technical advantage that specifically identified data elements are retained as publicly viewable, so that those data elements may be used by all of the entities with access to the data storage layer, for instance to provide consensus data. The improved functioning of the underlying computer hardware itself achieves further technical benefits. For example, the data storage controller 104 performs the complex processing needed to determine public data blocks and private data blocks, thereby reducing manual intervention and the possibility for data protection errors.

Figure 3:
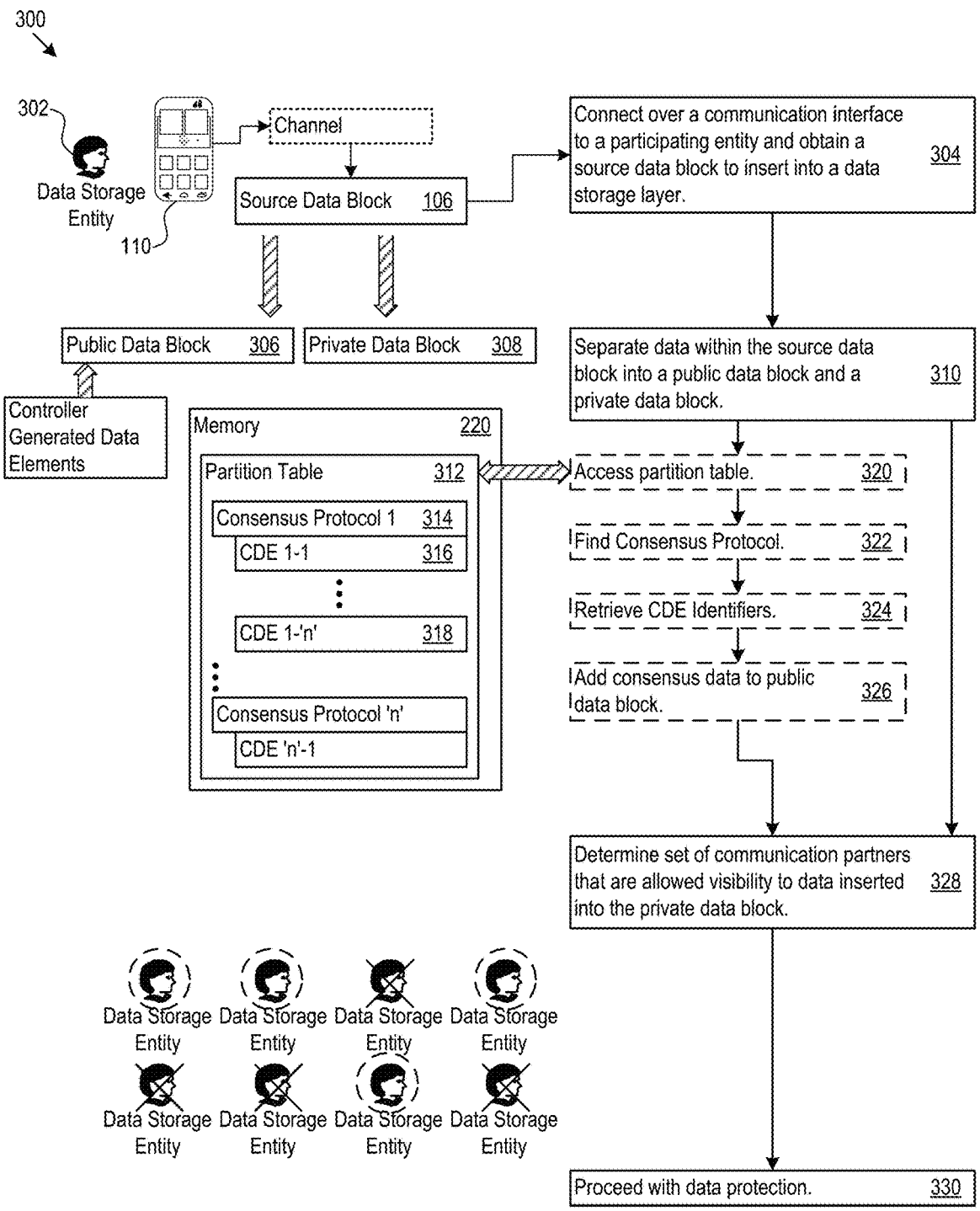
FIG. 3 shows an example implementation of partitioning logic.

FIG. 3 shows an example implementation of partitioning logic 300. Initially, a data storage entity 302 submits a source data block 106 through a communication channel to the data storage controller 104. The partitioning logic 300 separates data within the source data block into a public data block 306 and a private data block 308 (310). Note that data within the source data block may be included in both the public data block 306 and the private data block 308.

The public data block 306 contains information predetermined in any given system implementation to be suitable for disclosure to the entities that have access to the data storage layer 102. That data inserted into the public data block 306 is, for instance, substantively unaltered from the way it was received in the source data block 106. In addition, the public data block 306 may include system data generated by the data storage controller 104 for disclosure to the entities.

In the context of a blockchain data storage layer, the data in the public data block 306 may include, as examples, data used in achieving blockchain consensus, public transaction information details, transaction party identifiers, and other public data. There are many ways that the data storage controller 104 may determine which data to insert into the public data block 306 and which data to insert into the private data block 308. As one example, any system implementation may pre-define the distinction between public and private data elements.

As another example, the partitioning logic 300 may access a data structure such as the partition table 312 to determine public data elements and private data elements, e.g., as specified by data element identifiers in the partition table 312. In the context of a blockchain data storage layer, the partition table 312 may include consensus protocol identifiers, e.g., the consensus protocol identifier 314 linked to consensus data element (CDE) identifiers, e.g., the CDEs 1-1 316 through CDE 1-'n' 318. Examples of consensus protocol identifiers may include, e.g., "Byzantine", "Proof of Work", "Proof of Burn", "Proof of Capacity", "Proof of Elapsed Time" or other identifiers. The CDEs specify which data elements to add to the public data block 306, e.g., party name identifiers, transaction number identifiers, time stamps, or any other consensus protocol data. Expressed another way, the partitioning logic 300 accesses the partition table 312 (320) and finds the applicable consensus protocol in the partition table 312 (322). The partitioning logic 300 may then retrieve the CDE identifiers (324) linked to the applicable consensus protocol. Having the CDE identifiers, the partitioning logic 300 adds the specified consensus data elements to the public data block 306 (326).

Continuing the example shown in FIG. 3, the partitioning logic 300 determines a set of communication partners that are allowed visibility to data inserted into the private data block 308 (328). Permitted communication partners may be pre-defined and may depend on the type of data in the source data block 106. For instance, if the source data block represents a property exchange between Party A and Party B, through Bank C, then the permitted communication partners may be limited to Party A, Party B, and Bank C. As another example, if the source data block represents a draft of a new novel by Author A sent to five potential publishers P1-P5, then the permitted communication partners may be limited to Author A, and the publishers P1-P5. As yet another example, a delivery of source code from Consultant A to Employer E may result in Consultant A, Employer E, and Beta Tester B as permitted communication partners. In some implementations, the source 302 of the source data block 106 provides entity identifiers to the data storage controller that specify which parties are permitted to view the private data elements. After determining the permitted communication partners, the data storage controller 104 executes data protection steps on the private data block (330), e.g., by selectively applying encryption.

The data storage controller 104 may also issue a confirmation request and receive a request response to and from a pre-determined entity concerning the permitted communication partners. For instance, the confirmation request may ask an entity with a pre-defined connection to data in the private data block to confirm, deny, or further designate or remove permitted communication partners. As just a few examples, the pre-determined interest may be that the private data includes data elements provided by, describing, related to the entity's enterprise, or personal to that entity. As one example, a circuit designer entity may receive the confirmation request to authorize a proposed set of permitted parties initially determined by the data storage controller 104, when the private data will include circuit specifications describing a design created by the circuit designer. As another example, a patient may receive the confirmation request to authorize a proposed set of permitted parties, when the private data will include examination or other test results specific to that patient.

Figure 4:
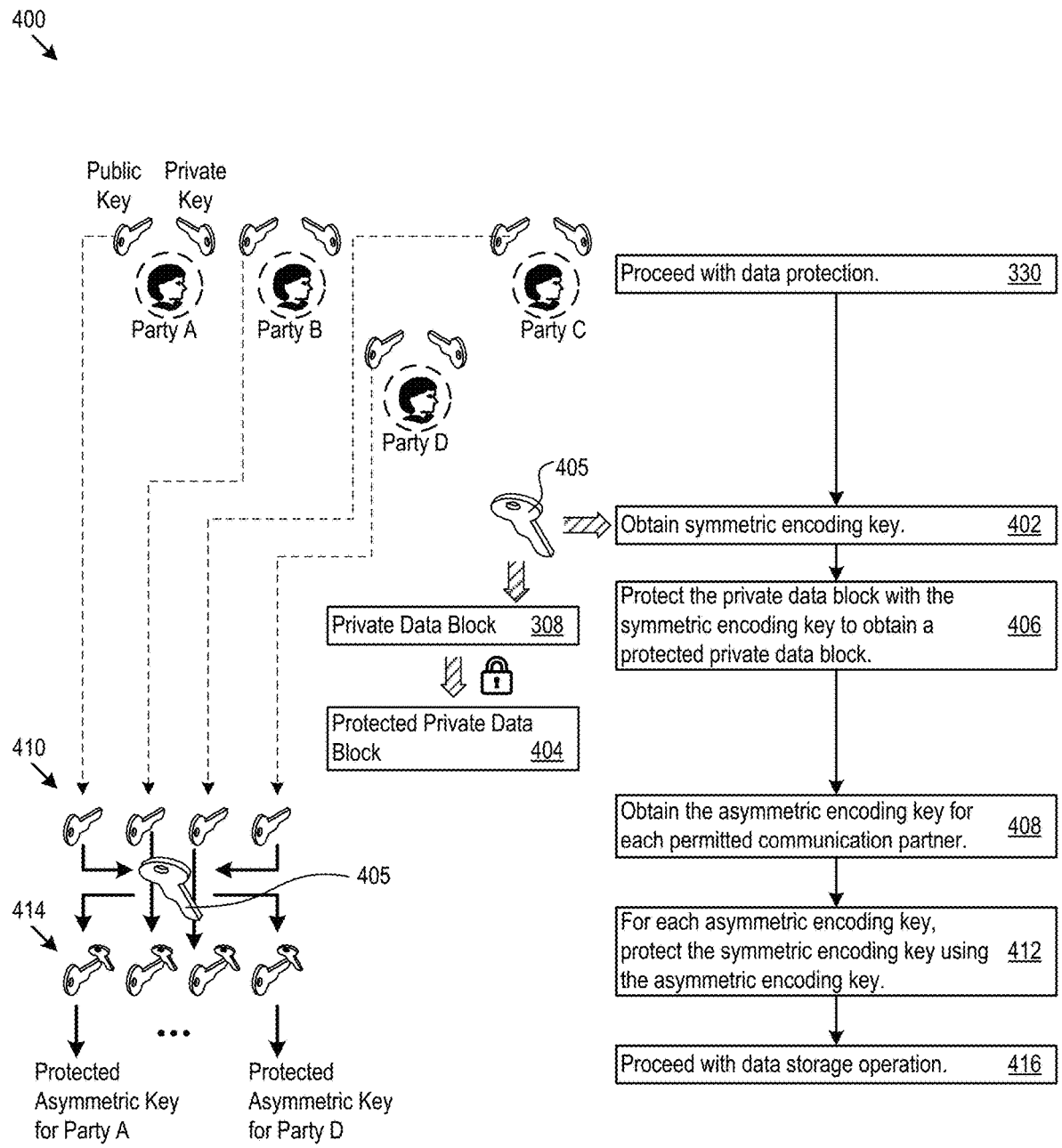
FIG. 4 shows an example implementation of encryption logic.

FIG. 4 shows an example implementation of encryption logic 400 that the data storage controller may implement to protect data in the private data block 308. The encryption logic 400 obtains a symmetric encoding key (402), e.g., by generating a new key or retrieving a key or key identifier from a secure key storage layer. The encryption logic 400 may obtain a new symmetric key for each new protected private data block, and some implementations may enforce a mandatory policy of obtaining and encoding with a different symmetric key for each private data block. Examples of symmetric keys include AES, 3DES, Twofish, and Serpent keys. The encryption logic 400 protects the private data block 308 with the symmetric encoding key 405 (e.g., via encryption) to obtain a protected private data block 404 (406).

For each permitted communication partner, the encryption logic 400 obtains an asymmetric encoding key or key identifier (e.g., a public key from a public/private key pair) linked to that communication partner (410). FIG. 4 shows an example set of different asymmetric encoding keys 410 obtained from the permitted communication partners in FIG. 3. For each asymmetric encoding key, the encryption logic 400 protects the symmetric encoding key 405 with the asymmetric encoding key (412), e.g., by encrypting the symmetric encoding key 405 with the asymmetric encoding key. The encryption logic 400 thereby obtains a set of communication partner-specific protected decoding keys 414, and may proceed with the data storage operations (416), e.g., as discussed with respect to FIG. 5.

As noted above in the discussion of FIG. 2, the data storage controller 104 may execute the encryption (and decryption) tasks by issuing HSM protocol messages to the HSM 224 over an encryption request interface. The encryption request interface may include a secure local bus or networked communication channel supported by the communication interfaces 202 for instance. In other implementations, the encryption executes in local hardware (e.g. the same hardware running the data storage controller 104) without using a separate hardware security module.

Figure 5:
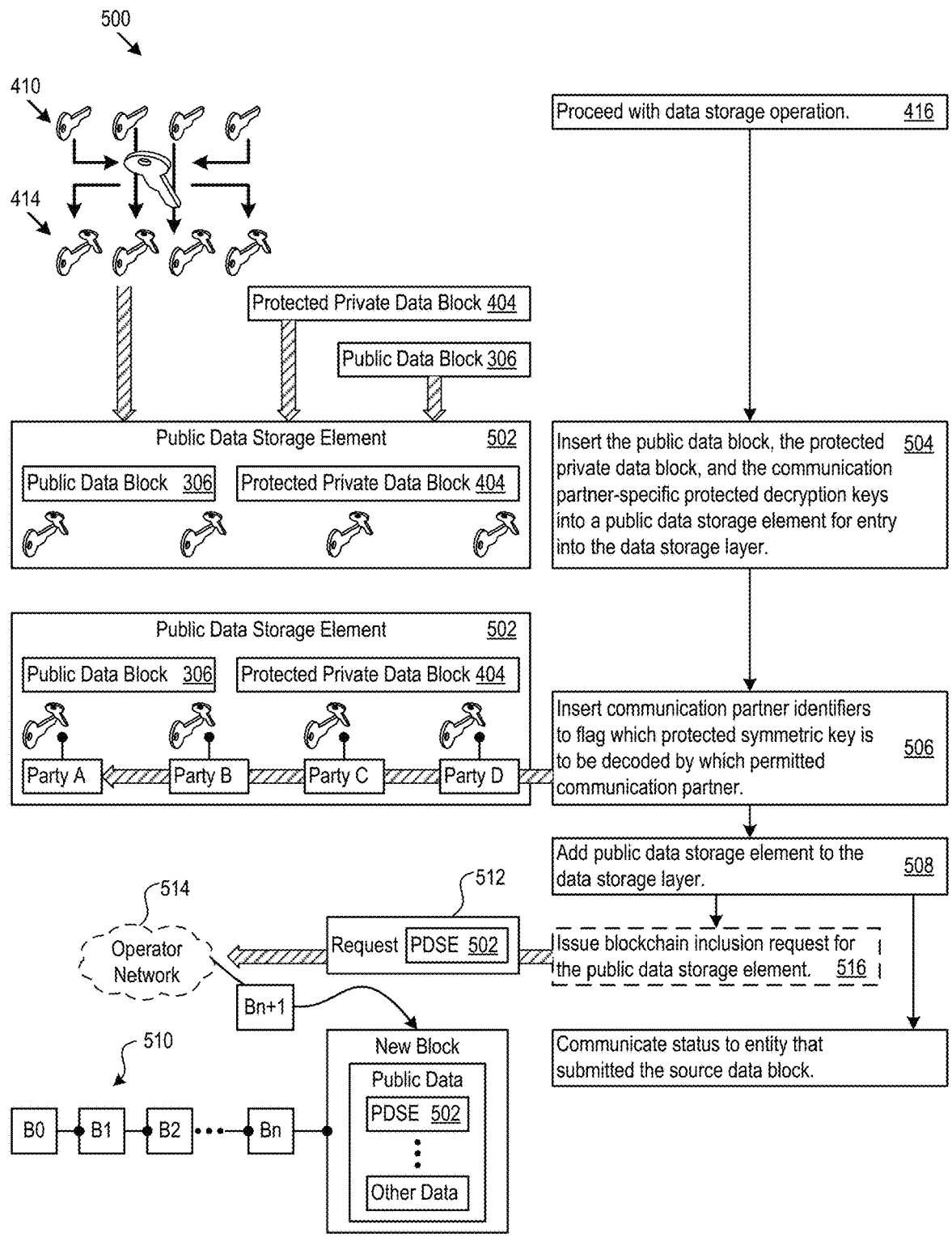
FIG. 5 shows an example of data storage logic.

FIG. 5 shows an example of data storage logic 500. The data storage logic 500 prepares a public data storage element 502 which will be added to the data storage layer 102. In this example, the data storage logic 500 adds the public data block 306, the protected private data block 404, and the communication partner-specific protected decryption keys 414 as a block of data that forms the public data storage element 502 (504).

In some implementations, the data storage logic 500 also adds communication partner identifiers that flag which protected decryption key is decodable by which permitted communication partner. This is not necessary, however, as each communication partner may instead decrypt each protected decryption key with their private key to generate a candidate symmetric encryption key and decode the protected private data block 404 with each candidate symmetric encryption key until meaningful data has been recovered.

Having prepared the public data storage element 502, the data storage logic 500 then adds (or coordinates adding) the public data storage element 502 into the data storage layer 102 (508). In one implementation where the data storage layer 102 is a blockchain 510, the data storage logic 500 queues the public data storage element for insertion into the blockchain 510 by, e.g., issuing a blockchain inclusion request 512 for the public data storage element 502 to a network of joint operators 514 (e.g., block mining entities or pre-defined group of participants in a private blockchain) of the data storage layer (516). The public data storage element 502 may become part of a larger public data block that stores many entries in a given block (e.g., the block 514) of the blockchain 510. Note, however, that selected elements of the given block (the protected private data block 404), while publicly accessible, are protected against unauthorized viewing by the symmetric key.

A permitted communication partner may access the data in the private data block 308 by accessing the data storage layer 102. In particular, the permitted communication partner accesses the public data storage element 502 and retrieves its specific protected asymmetric key, e.g., by searching for the matching communication partner identifier. The permitted communication partner decodes the protected asymmetric key, e.g., using its private key, to recover the asymmetric key 405. Having the asymmetric key 405, the permitted communication partner may then decrypt the protected private data block 404 to obtain the data in the private data block 308. In other implementations where communication partner identifiers are not present in the public data storage element 502, the permitted communication partner may decode each protected asymmetric key using its private key to generate candidate asymmetric keys, each of which may be tried against the protected private data block 404 to recover the data in the private data block 308.

The data storage controller 104 may act as a blockchain gateway. In that role, the data storage controller 104 may maintain any account information for an entity working with the blockchain, including storage and secure access to the public/private key pair, or identifiers of the key pair, for the entity. The blockchain gateway thereby facilitates automated signing of transactions sent to the blockchain using the private key and the sharing of the associated public key with other blockchain entities. In addition, the blockchain gateway may simplify integration with any distributed ledger system for any application by embedding the logic for interacting with the blockchain in the blockchain gateway. Further, the blockchain gateway orchestrates the execution of the cryptographic functions provided by the security manager interface to the HSM by executing the HSM protocol exchanges 226.

The data storage controller 104 supports modifying the data that is protected. Modifications may be allowed under any conditions agreed to by the network of joint operators, e.g., when the data is not related to legal agreements, or is not related to goods/money transfers. To facilitate modification, for example, an entity may decrypt the symmetric key, e.g., using its private key and decode the data in the private data block 308. The entity may then modify that data as desired, and submit the modified data in a new source data block to the data storage controller 104 for inclusion in the data storage layer, e.g., in a new block in the blockchain 510. Note that the entity that submits the new source data block may also specify a different set of permitted communication partners to the data storage layer 104. Accordingly, not only is the data modified, but the set of communication partners that can view the modified data may also change.

The discussion above provides several implementation examples. Expressed another way, the data storage controller includes a communication interface operable to receive a source data block for storage in a data storage layer. Partitioning circuitry is coupled to the communication interface and is to partition the source data block into a public data block and a private data block and determine a communication partner that is allowed visibility to the private data block. Encryption circuitry coupled to the partitioning circuitry is configured to obtain a symmetric encryption key, obtain an asymmetric encryption key linked to the communication partner, encrypt the private data block with the symmetric encryption key to obtain a protected private data block, and encrypt the symmetric encryption key with the asymmetric encryption key to obtain a protected decryption key. The asymmetric encryption key may be the public key of a public/private key pair.

The data storage controller also includes data storage circuitry coupled to the encryption circuitry. The data storage circuitry adds the public data block, the protected private data block, and the protected decryption key to a public data storage element and queues the public data storage element for insertion into the data storage layer. Communication partner identifiers may flag which protected decryption key is intended for which permitted communication partner. In some implementations, the data storage controller accesses a partition table to determine public data elements and private data elements. Responsive to the partition table, the data storage controller adds public data elements from the source data block into the public data block, and add the private data elements from the source data block into the private data block.

The data storage controller 104 delivers real-world efficiency benefits to many concrete processing scenarios. Some examples of real-world application of the data storage controller 104 include defining circuit specifications for new telecommunications products, with sensitive circuitry details protected in the private data block; storing telecommunication network packet transmission test characteristics with the public data defining public packet size and transmission protocol details, and the private data defining confidential customer identification and packet content information; and storing semiconductor mask definitions with the public data defining fabrication details available to chip manufacturers and private data defining confidential fabrication process steps protected for access by specific different manufacturers. Other real-world applications of the data storage controller 104 include patient records storage and sharing, P2P payments among several financial institutions, loyalty points conversion networks, E-voting, trade finance, car sharing, real estate registers, and capital market security exchanges as just a few examples.

As a specific example regarding patient records, a doctor may create a patient record in the data storage layer 102 and identify permitted parties (e.g., a specialist in radiology and a specialist in physical therapy) who will have access to the private data resulting from the patient examination. The doctor may then submit the source data block containing the examination results to the data storage controller 104 with an identification of the permitted parties. Due to the selectively controller protection of the private data, when the patient visits the radiologist, the radiologist has access to the examination results and can assist the patient. In turn, the radiologist may perform an examination and generate results in the form of additional private data. The radiologist may designate the initial doctor and his nurse (as examples) as permitted parties when submitting the new results to the data storage controller for inclusion in the data storage layer 102.

Another example involves real estate registers. The agent may, for instance, visit a seller's property and create a property reference in the data storage layer 102 with private data designated as permitted to several specific buyers' agents or individual buyers. Those permitted entities may then decode the private data to obtain the confidential details concerning the property. Similarly, offers from buyers may flow back through the data storage layer 102 to the seller and the seller's agent as the permitted parties. That is, the competing buyers and buyers' agents are not permitted to see the offers. If the sale is completed, the buyer and seller may permit certain details to be public data (e.g., address and parcel identification number), but mark other details as private and accessible only to government agents, the buyer, and the seller (e.g., the exact price and contract terms).

FIGS. 1-5 illustrate logic, circuitry, and processing features that may be used together in any particular combination. For instance, the partition table, data element identifiers, and consensus protocol identifiers may be present in some implementations, and absent in others. As another example, the encoding/decoding operations may take the form of symmetric or asymmetric encryption using public and private keys, but the data storage controller 104 may implement other forms of encoding to protect the private data block and corresponding decoding. As yet another example, a dedicated HSM is not required, but may be included in some implementations for enhanced security. The communication partner identifiers are optional as well, because (as explained above), an entity reading data from the data storage layer may try to decode each encoded symmetric key instead. Some implementations of the data storage controller 104 operate with blockchain technologies as the data storage layer, but other data storage mechanisms are also suitable.

The data storage controller 104 may be implemented as a stand-alone system, may be integrated with the hardware/software configuration of an endpoint device such as the smartphone 110 or PC 114, may be implemented as functionality in a virtual machine hosted by a cloud provider, or may be implemented in other manners. The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a data storage controller includes: a communication interface operable to receive a source data block for storage in a data storage layer; partitioning circuitry coupled to the communication interface, the partitioning circuitry configured to: partition the source data block into a public data block and a private data block; and determine a communication partner that is allowed visibility to the private data block; encryption circuitry coupled to the partitioning circuitry, the encryption circuitry configured to: obtain a symmetric encryption key; obtain an asymmetric encryption key linked to the communication partner; encrypt the private data block with the symmetric encryption key to obtain a protected private data block; and encrypt the symmetric encryption key with the asymmetric encryption key to obtain a protected decryption key; and data storage circuitry coupled to the encryption circuitry, the data storage circuitry configured to: add the public data block, the protected private data block, and the protected decryption key to a public data storage element; and queue the public data storage element for insertion into the data storage layer.

A2 The data storage controller of example A1, further comprising: a partition table; and where: the partitioning circuitry is further configured to: access the partition table to determine public data elements and private data elements; and responsive to the partition table, add public data elements from the source data block into the public data block, and add the private data elements from the source data block into the private data block.

A3 The data storage controller of example A2, where: the partition table comprises consensus data element identifiers.

A4 The data storage controller of example A3, where: the partition table comprises a consensus protocol identifier linked to the consensus data element identifiers.

A5 The data storage controller of any of examples A1-A4, where: the asymmetric encryption key comprises a public key, of a public key/private key pair, of the communication partner.

A6 The data storage controller of any of examples A1-A5, where: the encryption circuitry comprises a physical hardware security module, and further comprising: an encryption request interface between the physical hardware security module and the encryption circuitry.

A7 The data storage controller of any of examples A1-A6, where: the data storage circuitry is further configured to: add a communication partner identifier for the protected decryption key in the public data storage element.

A8 The data storage controller of any of examples A1-A7, where: the data storage circuitry is configured to queue the public data storage element for insertion by: issuing an inclusion request for the public data storage element to a network of joint operators of the data storage layer.

A9 The data storage controller of example A8, where: the inclusion request comprises a blockchain inclusion request.

B1 In an example, a data storage method includes: at a communication interface, receiving a source data block for storage in a data storage layer; with partitioning circuitry: partitioning the source data block into a public data block and a private data block; and determining a communication partner that is allowed visibility to the private data block; with encryption circuitry coupled to the partitioning circuitry: obtaining a symmetric encryption key; obtaining an asymmetric encryption key linked to the communication partner; encrypting the private data block with the symmetric encryption key to obtain a protected private data block; and encrypting the symmetric encryption key with the asymmetric encryption key to obtain a protected decryption key; and with data storage circuitry coupled to the encryption circuitry: adding the public data block, the protected private data block, and the protected decryption key to a public data storage element; and queueing the public data storage element for insertion into the data storage layer.

B2 The data storage method of example B1, further comprising: a partition table; and where: the partitioning circuitry is further configured to: access the partition table to determine public data elements and private data elements; and responsive to the partition table, add public data elements from the source data block into the public data block, and add the private data elements from the source data block into the private data block.

B3 The data storage method of example B2, where the partition table comprises consensus data element identifiers.

B4 The data storage method of example B3, where: the partition table comprises a consensus protocol identifier linked to the consensus data element identifiers.

B5 The data storage method of any of examples B1-B4, where: the asymmetric encryption key comprises a public key, of a public key/private key pair, of the communication partner.

B6 The data storage method of any of examples B1-B5, where: the encryption circuitry comprises a physical hardware security module, and further comprising: an encryption request interface between the physical hardware security module and the encryption circuitry.

B7 The data storage method of any of examples B1-B6, where: the data storage circuitry is further configured to: add a communication partner identifier for the protected decryption key in the public data storage element.

B8 The data storage method of any of examples B1-B7, where: the data storage circuitry is configured to queue the public data storage element for insertion by: issuing an inclusion request for the public data storage element to a network of joint operators of the data storage layer.

B9 The data storage method of example B8, where: the inclusion request comprises a blockchain inclusion request.

C1 In an example, a data storage controller includes: a communication interface operable to receive a source data block in a data storage layer; a partition table comprising element identifiers of public data elements and private data elements; partitioning circuitry coupled to the communication interface, the partitioning circuitry configured to: access the partition table, read the element identifiers, and responsively partition the source data block into a public data block comprising public data elements from the source data block, and a private data block comprising private data elements from the source data block; and determine a set of communication partners that are allowed access to data contained in the private data block; encryption circuitry coupled to the partitioning circuitry, the encryption circuitry configured to: obtain a symmetric encoding key; protect the private data block with the symmetric encoding key to obtain a protected private data block; and for each communication partner within the set of communication partners: obtain an asymmetric encoding key linked to that communication partner; protect the symmetric encoding key with the asymmetric encoding key to obtain a communication partner-specific protected decoding key; and data storage circuitry coupled to the encryption circuitry, the data storage circuitry configured to: add the public data block, the protected private data block, and the communication partner-specific protected decoding keys to a public data storage element; and request insertion of the public data storage element the data storage layer.

C2 The data storage controller of example C1, where: the data storage circuitry is further configured to: add a communication partner identifier for each of the communication partner-specific protected decoding keys into the public data storage element.

D1 A method implemented by operation of a system of any of examples A1-A10, C1, and C2.

E1 A product comprising instructions stored on a machine readable medium, the instructions configured to cause a machine to implement the method of example D1.

Various implementations have been specifically described. However, many other implementations are also possible.

What is claimed is:

1. A data storage controller comprising:
a communication interface operable to receive, over a network, a source data block for storage in a shared access block chain data storage layer;
partitioning circuitry coupled to the communication interface, the partitioning circuitry configured to:
partition the source data block into a public data block and a private data block; and
determine from among a plurality of communication partners with access to the public data block, only some of the communication partners as permitted communication partners who are allowed visibility to the private data block;
encryption circuitry coupled to the partitioning circuitry, the encryption circuitry configured to:
obtain a symmetric encryption key;
obtain a different asymmetric encryption key for each of the permitted communication partners;

encrypt the private data block with the symmetric encryption key to obtain a protected private data block; and encrypt the symmetric encryption key with the asymmetric encryption key of each of the permitted communication partners to obtain a protected decryption key for each respective permitted communication partner; and data storage circuitry coupled to the encryption circuitry, the data storage circuitry configured to:

add the public data block, the protected private data block, and the protected decryption key for each respective permitted communication partner to a public data storage element accessible to all of the plurality of communication partners over the network; and queue the public data storage element for insertion into the shared access block chain data storage layer via a block chain inclusion request transmitted to a network of joint operators managing the block chain data storage layer.

2. The data storage controller of claim 1, further comprising:

a partition table; and where:

the partitioning circuitry is further configured to:

access the partition table to determine public data elements and private data elements; and responsive to the partition table, add public data elements from the source data block into the public data block, and add the private data elements from the source data block into the private data block.

3. The data storage controller of claim 2, where:

the partition table comprises consensus data element identifiers.

4. The data storage controller of claim 3, where:

the partition table comprises a consensus protocol identifier linked to the consensus data element identifiers.

5. The data storage controller of claim 1, where:

the asymmetric encryption key for each of the permitted communication partners comprises a public key, of a public key/private key pair, of a respective communication partner.

6. The data storage controller of claim 1, where:

the encryption circuitry comprises a physical hardware security module, and further comprising:

an encryption request interface between the physical hardware security module and the encryption circuitry.

7. The data storage controller of claim 1, where:

the data storage circuitry is further configured to:

add a communication partner identifier for the protected decryption key of each respective permitted communication partner in the public data storage element.

8. A data storage method comprising:

at a communication interface, receiving, via a network comprising a public network a private network, or both, a source data block for storage in a block chain data storage layer, the block chain data storage layer being accessible by any of a plurality of communication partners via the public network, the private network, or both;

with partitioning circuitry:

partitioning the source data block into a public data block and a private data block; and identifying those communication partners who are allowed visibility to the private data block;

with encryption circuitry coupled to the partitioning circuitry:

obtaining a symmetric encryption key;

obtaining different asymmetric encryption keys for each of the communication partners, each of the different asymmetric encryption keys linked to a different respective one of the communication partners;

encrypting the private data block with the symmetric encryption key to obtain a protected private data block; and separately encrypting the symmetric encryption key with each of the asymmetric encryption keys to obtain a protected decryption key for each of the communication partners; and with data storage circuitry coupled to the encryption circuitry:

adding the public data block, the protected private data block, and the protected decryption key to a public data storage element, the public data storage element accessible by any of the plurality of communication partners; and queueing the public data storage element for insertion into the data storage layer.

9. The method of claim 8, further comprising:

a partition table; and where:

the partitioning circuitry is further configured to:

access the partition table to determine public data elements and private data elements; and responsive to the partition table, add public data elements from the source data block into the public data block, and add the private data elements from the source data block into the private data block.

10. The method of claim 9, where:

the partition table comprises consensus data element identifiers.

11. The method of claim 10, where:

the partition table comprises a consensus protocol identifier linked to the consensus data element identifiers.

12. The method of claim 8, where:

the different asymmetric encryption keys of each of the communication partners comprises a public key, of a public key/private key pair, of a respective communication partner.

13. The method of claim 8, where:

the encryption circuitry comprises a physical hardware security module, and further comprising:

an encryption request interface between the physical hardware security module and the encryption circuitry.

14. The method of claim 8, where:

the data storage circuitry is further configured to:

add, in the public data storage element, a communication partner identifier for the protected decryption key of each of the communication partners.

15. The method of claim 8, where:

the data storage circuitry is configured to queue the public data storage element for insertion by:

issuing an inclusion request for the public data storage element to a network of joint operators of the data storage layer.

16. The method of claim 15, where:

the inclusion request comprises a blockchain inclusion request.

17. A data storage controller comprising:

a communication interface operable to receive, over a network, a source data block, the source data block received for insertion in a data storage layer of a block chain having shared network access by a plurality of communication partners;
a partition table comprising element identifiers of public data elements and private data elements;
partitioning circuitry coupled to the communication interface, the partitioning circuitry configured to:
    access the partition table, read the element identifiers, and responsively partition the source data block into a public data block comprising public data elements from the source data block, and a private data block comprising private data elements from the source data block; and
    determine, from among the plurality of communication partners having shared network access to the block chain, a set of communication partners that are allowed access to data contained in the private data block, wherein all the plurality of communication partners have access to the public data block;
encryption circuitry coupled to the partitioning circuitry, the encryption circuitry configured to:
    obtain a symmetric encoding key;
    protect the private data block with the symmetric encoding key to obtain a protected private data block; and
    for each communication partner within the set of communication partners:
        obtain an asymmetric encoding key linked to that communication partner;
        protect the symmetric encoding key with the asymmetric encoding key to obtain a communication partner-specific protected decoding key; and
data storage circuitry coupled to the encryption circuitry, the data storage circuitry configured to:
    add the public data block, the protected private data block, and the communication partner-specific protected decoding keys to a public data storage element; and
    request insertion of the public data storage element in the data storage layer of the block chain to provide shared network access to the public data storage element by the plurality of communication partners.

18. The data storage controller of claim 17, where:
the data storage circuitry is further configured to:
    add a communication partner identifier for each of the communication partner-specific protected decoding keys into the public data storage element.

* * * * *